United States Patent Office 3,200,087
Patented Aug. 10, 1965

3,200,087
POLYMERIZATION OF CARBODIIMIDES
TO SOLID POLYMERS
Gene C. Robinson, Baton Rouge, La., assignor to Ethyl Corporation, New York, N.Y., a corporation of Virginia
No Drawing. Filed Apr. 27, 1962, Ser. No. 190,834
13 Claims. (Cl. 260—2)

This invention relates to and has as its chief object the provision of a novel catalytic polymerization process for preparing solid carbodiimide polymers.

According to this invention solid carbodiimide polymers are produced by contacting a polymerizable carbodiimide monomer with an organometallic polymerization catalyst at a temperature in the range of from about 0 to about 120° C. sufficient to form said polymer but insufficient to effect substantial thermal degradation thereof, the catalyst being a hydrocarbon compound of a metal of Groups I-A through III-A of the Periodic Table. The polycarbodiimides produced by this process apparently

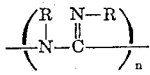

where R is a hydrocarbon group (e.g. ethyl, phenyl, 2-phenylethyl, allyl) and $n$ is an integer corresponding to the number of monomeric units chemically bonded together in the resultant polymer. Generally speaking, the molecular weights of the solid polycarbodiimides made by the process of this invention range from about 2,000 to about 300,000.

A variety of polymerizable carbodiimide monomers are usable in the process of this invention. Illustrative examples include such compounds as dimethyl carbodiimide, diethyl carbodiimide, dibutyl carbodiimide, dioctyl carbodiimide, diphenyl carbodiimide, di-p-tolyl carbodiimide, di-m-ethylphenyl carbodiimide, d-2,4-xylyl carbodiimide, dibenzyl carbodiimide, di-2-phenylethyl carbodiimide, d-p-tert-butylbenzyl carbodiimide, and the like. By the same token, the hydrocarbon groups present in the monomer may differ from each other, phenylmethyl carbodiimide and benzylethyl carbodiimide serving as examples. Preferably the alkyl, alkenyl, aryl, alkaryl or aralkyl groups present in these monomers contain up to about 8 carbon atoms. Mixtures of such monomers can also be used. In this way interpolymers of two or more of these monomers may be formed.

A temperature ranging from somewhat below about 0° C. up to about 120° C. is used in conducting this process. The preferred temperatures range from about 15° to about 50° C., excellent results being obtained in many cases by conducting the reaction at essentially room temperature (i.e. 20–30° C.).

Experimental evidence indicates in general that the rate of polymerization is somewhat faster at the higher temperatures of the foregoing range. However, carbodiimide polymers have a general tendency of undergoing thermal degradation if the temperatures become excessively high (i.e. substantially above about 130–140° C.). Accordingly, the process of this invention is conducted at an appropriate temperature which is sufficient to form the desired polymer yet insufficient to result in substantial thermal degradation thereof. This thermal degradation phenomenon definitely appears to be a depolymerization reaction which apparently can result in total decomposition of the polymer into monomeric units.

The precise temperature at which this thermal degradation occurs will vary somewhat dependent upon the nature of the hydrocarbon substituents present in the polymer and upon the molecular weight of the polymer itself. Therefore, the upper temperature limit utilized in the process of this invention is not susceptible of precise numerical definition. A poly-diethylcarbodiimide, however, has been found to thermally degrade quite extensively on heating to temperatures of about 150° C.

Catalysts used in conducting the present process are such organometallic compounds as phenyl lithium, amyl sodium, allyl potassium, benzyl sodium, propyl rubidium, methyl cesium, cyclohexyl lithium, ethyl sodium, di-tert-butyl beryllium, diethyl zinc, dipropyl cadmium, diethyl mrecury, cyclopentadienyl zinc ethyl, triethyl boron, tributyl boron, bis-3-methyl-2-butyl boron hydride, triethyl aluminum, diethyl aluminum hydride, triisobutyl aluminum, cyclopentadienyl thallium, tris-methyl cyclopentadienyl aluminum, vinyl lithium, allyl lithium, methylcyclohexyl sodium, phenyl sodium, and other like hydrocarbon compounds of the metals of Groups I-A, II-A, II-B and III-A of the Periodic System. For purposes of classifiication of these metals reference is made to the Periodic Chart of the Elements as set forth in "Handbook of Chemistry" by Lange, 6th edition, 1946, pp. 58–59. Although strictly speaking, boron is a metalloid, the use of alkyl, cycloalkyl and aryl boron compounds ($R_3B$, $R_2BH$, $RBH_2$) is within the ambit of this invention. The preferred catalysts are the hydrocarbon alkali metal compounds, especially those in which the hydrocarbon group contains up to about 12 carbon atoms. Of these particular compounds the alkyl derivatives of lithium, sodium and potassium are cheaper and, therefore, preferable. Particularly good results have been achieved by the use of butyl lithium, a particularly preferred catalyst for use in this invention.

This process can be conducted in the presence or absence of an inert diluent. If no diluent is used the polymerization is accomplished by bringing together the catalyst and the carbodiimide monomer under the appropriate polymerization conditions described herein. However, generally speaking greater temperature control can be exercised by the use of an inert organic diluent and, therefore, this usage is preferable. A variety of inert organic solvents can be so-used. Examples of these include the various inert hydrocarbons such as paraffinic hydrocarbons, e.g. hexane, heptane, octane, nonane, decane, petroleum naphtha, petroleum ethers; cycloparaffins, e.g. cyclopentane, the methyl and dimethyl cyclopentanes, cyclohexane, the methyl and dimethyl cyclohexanes, cycloheptane, the methyl and dimethyl cycloheptanes; aromatics, e.g. benzene, toluene, xylene, mesitylene, tetrahydronaphthalene, ethyl benzene, cymene, and the like. Other suitable solvents include ethers, e.g. diethyl ether, dibenzyl ether, the dimethyl ether of diethylene glycol, 1,4-dioxane, 1,3-dioxolane, tetrahydrofuran; amides, e.g. dimethyl formamide, dibutyl formamide; and the like. From a cost effectiveness standpoint the hydrocarbons, especially the liquid aromatic hydrocarbons are preferable.

Essentially anhydrous reaction conditions are utilized in practicing the present process because the foregoing catalysts are rapidly and sometimes violently decomposed on contact with appreciable quantities of water. However, small quantities of moisture which may be present through atmospheric contamination or through the use of slightly moist inert diluents will not adversely affect the reaction. In such case a portion of the catalyst would be consumed as a drying agent for the system.

Inert atmospheres should be used. Suitable inert gases include nitrogen, argon, krypton, gaseous paraffinic hydrocarbons (e.g. methane, ethane, propane), and the like.

The ratios of the ingredients used in the present process do not appear to be particularly critical although it is desirable to provide a sufficiently concentrated system so that there is ample opportunity for intimate contact between the catalyst and the monomer. Hence, when a diluent is employed it is generally desirable to use that amount which is sufficient to provide a suitably fluid medium with monomer concentrations from about 50 volume percent to about 5 volume percent present therein. Similarly, the catalyst concentrations based upon the monomer generally fall within the range of from about 10 mole percent to about 0.1 mole percent for best results.

Times ranging from about a matter of minutes up to about several hours or more are generally sufficient to effect substantial yields of polycarbodiimide polymers when using this process. Experimental work with the particularly preferred butyl lithium catalyst when used with diethylcarbodiimide has shown that the reaction is completed essentially as soon as the catalyst and this monomer have been brought into intimate contact with each other. Therefore, the process of this invention can be conducted on a batch, a continuous or a semi-continuous basis, utilizing any convenient residence period within the polymerization zone.

EXAMPLE I

*Preparation of diethylcarbodiimide.*—To a stirred solution of 26.4 g. (0.20 mole) of diethylthiourea in 200 ml. of diethyl ether was added 21.7 g. (0.10 mole) of yellow mercuric oxide. After a variable induction period, reaction began as indicated by an increased rate of reflux and the appearance of black mercuric sulfide in the reaction mixture. Three more 21.7-g. portions of mercuric oxide were added at intervals as the reaction slowed down. The mixture was heated under reflux for 15 minutes after addition of the final portion. The solids were then separated by filtration through a medium porosity sintered glass filter. The filtrate was dried with magnesium sulfate and the dried ether solution was separated from the drying agent by decantation.

The ether solvent was removed through a Claisen head at atmospheric pressure. The crude product was purified by distillation at 100 mm. Hg through a Claisen head. There was obtained 12 g. (61 percent) of diethylcarbodiimide (B.P. 68° C./100 mm).

*Polymerization of diethylcarbodiimide.*—Dry toluene (10 ml.) was put into a 25-ml. Erlenmeyer flask along with a boiling stone. The toluene was heated to boiling to expel moisture and air from the flask, and the flask was capped with a serum rubber cap while the toluene was still boiling. The flask was cooled rapidly to 25° C. and the resultant vacuum was broken with dry nitrogen. Diethylcarbodiimide (5 ml.) was introduced into the flask with a hypodermic syringe. Then 0.75 ml. of an 0.4 M solution of n-butyl lithium in toluene was introduced with a hypodermic syringe. Polymerization began within seconds. The flask was cooled to maintain the temperature near 25° C. After 16 hours at 25° C., methanol was added to destroy n-butyl lithium. The product was washed repeatedly on a medium porosity sintered glass filter with methanol. The dried polydiethylcarbodiimide product weighed 4.0 g. and was a white, insoluble solid. The solid decomposed in a melting point tube near 165° C., giving a colorless volatile liquid.

This polymer is extremely insoluble in organic solvents. It failed to dissolve appreciably in benzene, toluene, methanol, diethylcarbodiimide, acetone, triethylamine, dimethylaniline, dimethylformamide, the dimethyl ether of diethylene glycol, or ethanol. The polymer was converted to a transparent gel by phenol and glacial acetic acid but did not truly dissolve. It was readily soluble in dilute hydrochloric acid and in aqueous acetic acid. On basification these aqueous solutions precipitated a white solid.

EXAMPLE II

*Poly - dibutylcarbodiimide.* — Di-n-butylcarbodiimide monomer was prepared by a procedure similar to that given in Example I above. Portions of this monomer were polymerized by the use of several techniques. In one run, 1.0 ml. dibutylcarbodiimide in 7 ml. toluene was put in a 10 ml. Erlenmeyer flask capped with a serum rubber cap pierced with a hypodermic needle and heated to boiling to expel air and moisture. To the cooled mixture was added a total of 0.3 ml. of n-butyl lithium in hexane (2.3 M.). After 48 hours solid poly-dibutylcarbodiimide polymer was contained in the flask.

A very similar experiment was carried out with diphenyl ether as the solvent with similar results. Addition of n-butyl lithium to neat monomer also led to polymer.

The yields of hydrocarbon insoluble, methanol insoluble product was approximately 12 percent in each case. The monomer did not thermally polymerize on heating at 125° C.

EXAMPLE III

*Poly-diallylcarbodiimide.*—To a 10 ml. Erlenmeyer flask was added 5.5 ml. of dry toluene. Thereupon the toluene was boiled to expel air and moisture from the flask which was then capped with a rubber cap. Injected through the thin rubber cap was 1.05 g. diallylcarbodiimide [see Ber. 71B, 1933 (1938)]. Then 0.10 ml. of a 2.3 molar solution of n-butyl lithium in n-pentane was added. Polymerization began immediately and on long standing the mixture set to a gel. Dilution with methanol, filtering and drying yielded 0.97 g. (92 percent yield) of white solid polymer—viz. poly-diallylcarbodiimide.

EXAMPLE IV

*Poly-di-2-phenylethylcarbodiimide.*—A 10 ml. Erlenmeyer flask was flushed with nitrogen to remove air and moisture, and capped with a thin rubber cover. Into the flask was injected 1.72 g. of di-2-phenylethylcarbodiimide and 0.13 ml. of a 2.3 molar solution of n-butyl lithium in n-pentane. After standing 5 days the mixture was diluted with benzene. It was completely miscible. Subsequent use of methanol gave a white methanol-insoluble material. Prolonged washing with methanol led to a gummy solid polymer. The weight of poly-di-2-phenylethylcarbodiimide polymer was 0.7 g. (40 percent yield).

EXAMPLE V

*Poly-diphenylcarbodiimide.* — Toluene (5 ml.) was placed in a 10 ml. Erlenmeyer flask and brought to a boil so as to remove moisture from the system. Thereupon the flask containing the toluene was capped with a thin rubber cover. Then 1.1 ml. of diphenylcarbodiimide was injected through the cover into the toluene followed by 0.15 ml. of a 2.3 molar solution of butyl lithium in n-pentane. The resultant system was allowed to stand for 4 hours and diluted with methanol. The solids which were formed were recovered by filtration, washed and dried. The yield of poly-diphenylcarbodiimide—a white solid—was 0.6 g.

The polymers produced by the process of this invention are useful in the chemical and allied arts. For example, they may be used as thickening agents, especially in aqueous media. By way of example, portions of the poly-diethylcarbodiimide made by the procedure of Example I were dissolved in 80 percent acetic acid. Thereupon the viscosities of the solutions were determined. When the polymer concentration was 1 gram per 100 ml. the solution viscosity ($N_{sp/c}$) was about 0.51. At a concentration of 4 grams per 100 ml. the viscosity of the solution was about 0.67 $N_{sp/c}$.

The resultant polymers may also find use in the formulation of detergents and water softeners. These polymers are believed to have chelation activity, that is, the ability to complex with metallic ions which are present in water having a hardness above 0. This chelation activity would thereby enable the detergent to exert a greater surface activity per unit weight or enable the reduction of the hardness of the water.

Other uses for the above polymers will now be evident to those skilled in the art.

In conducting the process of this invention it is highly preferable to subject the resultant polycarbodiimide polymer to an after-treatment which substantially improves its thermal stability. This after-treatment involves contacting the polycarbodiimide polymer with an anhydride of a saturated mono basic carboxylic acid at a temperature below that at which substantial thermal degradation of the unstabilized polymer would occur. Acetic anhydride is a particularly preferred treating agent although such anhydrides as butyric anhydride, octanoic anhydride, the anhydride of cyclohexanecarboxylic acid, and similar anhydrides can be effectively used. In this way, the polymer may be subjected to higher temperatures than the untreated polymer without encountering thermal degradation of the polymer into monomeric units. By way of example, a portion of the poly-diethylcarbodiimide prepared by the procedure of Example I was immersed in acetic anhydride for one-half hour at 50° C. Upon withdrawal of the polymer from the system, and after washing and drying, this treated polymer was found not to decompose until the temperature reached approximately 215–225° C. As seen from Example I above another portion of this polymer which had not been so-treated decomposed when heated to about 165° C.

Further details of this preferred after-treatment procedure are set forth in my copending application Serial No. 190,833 filed April 27, 1962.

What is claimed is:

1. A process for the preparation of a solid carbodiimide polymer characterized by contacting a polymerizable carbodiimide monomer of the formula

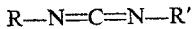

R—N=C=N—R' wherein R and R' are hydrocarbon radicals selected from the group consisting of alkyl, alkenyl and aryl radicals containing up to about 12 carbon atoms, with an organometallic polymerization catalyst at a temperature in the range of from about 0° to about 120° C. sufficient to form said polymer but insufficient to effect substantial thermal degradation thereof, said catalyst being a hydrocarbon compound of a metal of Groups I–A through III–A of the Periodic Chart of the Elements as set forth in "Handbook of Chemistry" by Lange, 6th edition, 1946, pp. 58–59, wherein each hydrocarbon radical contains from 1 to about 12 carbon atoms.

2. The process of claim 1 wherein the metal of said catalyst is an alkali metal.
3. The process of claim 1 wherein the metal of said catalyst is lithium.
4. The process of claim 1 wherein said catalyst is butyl lithium.
5. The process of claim 1 wherein the polymerization is conducted in an inert organic diluent.
6. The process of claim 1 wherein the polymerization is conducted in an aromatic hydrocarbon diluent.
7. The process of claim 1 wherein said temperature is within the range of from about 15° to about 50° C.
8. The process of claim 1 wherein said catalyst is butyl lithium and the polymerization is conducted at essentially room temperature utilizing an aromatic hydrocarbon diluent.
9. The process of claim 1 wherein said monomer is diethyl carbodiimide.
10. The process of claim 1 wherein said monomer is dibutyl-carbodiimide.
11. The process of claim 1 wherein said monomer is diallyl carbodiimide.
12. The process of claim 1 wherein said monomer is bis(2-phenylethyl)carbodiimide.
13. The process of claim 1 wherein said monomer is diphenyl carbodiimide.

References Cited by the Examiner
UNITED STATES PATENTS

| 2,853,473 | 9/58 | Campbell et al. | 260—2 |
| 2,941,966 | 6/60 | Campbell | 260—2 |
| 2,941,983 | 6/60 | Sneltz | 20—2 |

OTHER REFERENCES

Khorana: Chemical Reviews, vol. 53, #2, 1953, pp. 145–166.

WILLIAM H. SHORT, *Primary Examiner.*

OSCAR R. VERTIZ, *Examiner.*